(12) United States Patent
Guan (10) Patent No.: US 9,622,232 B2
(45) Date of Patent: Apr. 11, 2017

(54) METHOD, USER EQUIPMENT, AND BASE STATION FOR TRANSMITTING INFORMATION

(71) Applicant: Huawei Technologies Co., Ltd., Shenzhen (CN)

(72) Inventor: Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 28 days.

(21) Appl. No.: 14/222,170

(22) Filed: Mar. 21, 2014

(65) Prior Publication Data

US 2014/0211709 A1 Jul. 31, 2014

Related U.S. Application Data

(63) Continuation of application No. PCT/CN2012/080394, filed on Aug. 21, 2012.

(30) Foreign Application Priority Data

Sep. 23, 2011 (CN) .......................... 2011 1 0285543

(51) Int. Cl.
 *H04W 72/04* (2009.01)
 *H04L 1/00* (2006.01)
 *H04W 72/02* (2009.01)

(52) U.S. Cl.
 CPC ......... *H04W 72/042* (2013.01); *H04L 1/0026* (2013.01); *H04L 1/0027* (2013.01); *H04W 72/02* (2013.01); *H04W 72/0413* (2013.01)

(58) Field of Classification Search
 CPC .................................................. H04W 72/042
 See application file for complete search history.

(56) References Cited

U.S. PATENT DOCUMENTS

| 8,774,027 | B2 * | 7/2014 | Choi et al. ..................... 370/252 |
| 2011/0235743 | A1 * | 9/2011 | Lee et al. ....................... 375/295 |
| 2012/0039199 | A1 * | 2/2012 | Chen ..................... H04L 1/0027 370/252 |

(Continued)

FOREIGN PATENT DOCUMENTS

| CN | 101917259 A | 12/2010 |
| CN | 101958772 A | 1/2011 |

(Continued)

OTHER PUBLICATIONS

International Search Report and Written Opinion received in Application No. PCT/CN2012/080394 mailed Nov. 29, 2012, 13 pages.

(Continued)

*Primary Examiner* — Jason Mattis
(74) *Attorney, Agent, or Firm* — Slater Matsil, LLP (57) ABSTRACT

The present invention discloses a method, a user equipment, and a base station for transmitting information. The method includes receiving a downlink assignment sent by a base station. The downlink assignment includes a trigger flag that is used to indicate a trigger state of aperiodic channel state information (CSI). An uplink resource used to send the aperiodic CSI is determined. The aperiodic CSI to the base station is sent on the uplink resource according to the trigger flag.

18 Claims, 4 Drawing Sheets

(56) References Cited

U.S. PATENT DOCUMENTS

| | | | |
|---|---|---|---|
| 2012/0076017 A1* | 3/2012 | Luo | H04L 1/0027 370/252 |
| 2012/0218948 A1* | 8/2012 | Onggosanusi | H04L 1/0031 370/329 |
| 2013/0039282 A1* | 2/2013 | Dhere | H04W 76/025 370/329 |
| 2013/0070720 A1 | 3/2013 | Pan et al. | |
| 2014/0211767 A1* | 7/2014 | Lunttila et al. | 370/336 |

FOREIGN PATENT DOCUMENTS

| | | | |
|---|---|---|---|
| CN | 102082636 A | 6/2011 |
| CN | 102307083 A | 1/2012 |
| EP | 2337413 A1 | 6/2011 |

OTHER PUBLICATIONS

Fujitsu, "Aperiodic CQI Reporting for Multiple DL Component Carriers," 3GPP TSG-RAN WG1 Meeting #62bis; R1-105742, Oct. 11-15, 2010, 3 pages.

* cited by examiner

METHOD, USER EQUIPMENT, AND BASE STATION FOR TRANSMITTING INFORMATION

This application is a continuation of International Application No. PCT/CN2012/080394, filed on Aug. 21, 2012, which claims priority to Chinese Patent Application No. 201110285543.9, filed on Sep. 23, 2011, both of which are hereby incorporated by reference in their entireties.

TECHNICAL FIELD

The present invention relates to the field of communications technologies and, in particular embodiments, to a method, a user equipment, and a base station for transmitting information.

BACKGROUND

In a Long Term Evolution ("LTE") system, an evolved base station ("eNB") performs uplink and downlink data scheduling for a user equipment ("UE") through a physical downlink control channel ("PDCCH"), where a minimum scheduling interval is one subframe, and a time duration of one subframe is 1 millisecond. A PDCCH used for the downlink data scheduling is referred to as a downlink assignment (DL_Assignment), and a PDCCH used for the uplink data scheduling is referred to as an uplink grant (UL_Grant). When a base station performs downlink data scheduling for a UE, channel state information (CSI, Channel State Information) fed back by the UE is required. One CSI feedback manner in the LTE system is an aperiodic CSI feedback. Specifically, the aperiodic CSI feedback is triggered through an uplink grant UL_Grant, and the uplink grant UL_Grant notifies resources occupied by the aperiodic CSI.

However, when a data volume of downlink scheduling is large, dependence on the aperiodic CSI fed back by the UE may be strong. If there is no uplink data scheduling at the time, uplink grants UL_Grants are sent because the aperiodic CSI is required to be fed back, and therefore, there will be many uplink grants UL_Grants that schedule only the aperiodic CSI, thereby leading to an increase of PDCCH overhead.

Therefore, it is necessary to provide a corresponding technical solution that can trigger feedback of aperiodic CSI and reduce control channel overhead.

SUMMARY OF THE INVENTION

Embodiments of the present invention provide a method, a user equipment, and a base station for transmitting information, which can trigger feedback of aperiodic CSI, and reduce control channel overhead.

According to one aspect, an embodiment of the present invention provides a method for transmitting information. A downlink assignment is sent by a base station. The downlink assignment includes a trigger flag that used to indicate a trigger state of aperiodic channel state information CSI. An uplink resource used to send the aperiodic CSI is determined. The aperiodic CSI to the base station is sent on the uplink resource according to the trigger flag.

According to another aspect, an embodiment of the present invention provides a method for transmitting information. A downlink assignment is sent to a user equipment. The downlink assignment includes a trigger flag that is used to indicate a trigger state of aperiodic channel state information CSI. An uplink resource used to receive the aperiodic CSI is determined. The aperiodic CSI sent by the user equipment is received on the uplink resource according to the trigger flag.

According to still another aspect, an embodiment of the present invention provides a user equipment. A receiving module is configured to receive a downlink assignment sent by a base station. The downlink assignment includes a trigger flag. That used to indicate a trigger state of aperiodic channel state information CSI. A determining module is configured to determine an uplink resource used to send the aperiodic CSI. A sending module is configured to send, according to the trigger flag included in the downlink assignment received by the receiving module, the aperiodic CSI to the base station on the uplink resource determined by the determining module.

According to yet another aspect, an embodiment of the present invention provides a base station. A sending module is configured to send a downlink assignment to a user equipment. The downlink assignment includes a trigger flag that is used to indicate a trigger state of aperiodic channel state information CSI. A determining module is configured to determine an uplink resource used to receive the aperiodic CSI. A receiving module is configured to receive, on the uplink resource determined by the determining module and according to the trigger flag included in the downlink assignment sent by the sending module, the aperiodic CSI sent by the user equipment.

Based on the foregoing technical solutions, according to the method, the user equipment, and the base station for transmitting information of the embodiments of the present invention, a downlink assignment includes a trigger flag, where the trigger flag is used to indicate a trigger state of aperiodic channel state information CSI, thereby enabling triggering of an aperiodic CSI feedback, reducing control channel overhead, and improving a utilization rate of system resources.

BRIEF DESCRIPTION OF THE DRAWINGS

To describe the technical solutions of the embodiments of the present invention more clearly, the following briefly introduces the accompanying drawings required for describing the embodiments of the present invention. Apparently, the accompanying drawings in the following description illustrate merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as, a global system for mobile communications ("GSM"), a code division multiple access ("CDMA") system, a wideband code division multiple access ("WCDMA") system, a general packet radio service ("GPRS"), a long term evolution ("LTE") system, an LTE frequency division duplex ("FDD") system, an LTE time division duplex ("TDD"), a universal mobile telecommunications system ("UMTS") and so on.

It should also be understood that, in the embodiments of the present invention, a user equipment ("UE") may be called a terminal, a mobile station ("MS"), a mobile terminal and so on. The user equipment may communicate with one or more core networks through a radio access network ("RAN"). For example, the user equipment may be a mobile phone (or referred to as a "cellular" phone), a computer with a mobile terminal, or the like. For example, the user equipment may further be a portable, pocket-sized, handheld, computer built-in or vehicle-mounted mobile apparatus, which exchanges voices and/or data with a radio access network.

In the embodiments of the present invention, the base station may be a base station (Base Transceiver Station, briefly referred to as "BTS") in GSM or CDMA, or a base station (NodeB, briefly referred to as "NB") in WCDMA, or an evolved base station (Evolved Node B, briefly referred to as "eNB or e-NodeB") in LTE, which is not limited in the present invention. For ease of description, the following embodiments are described by using a base station eNB and a user equipment UE as an example.

Figure 1:
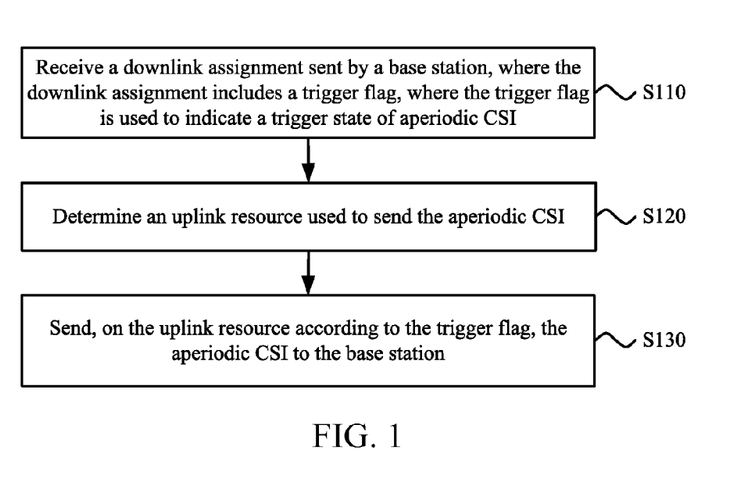
FIG. 1 is a schematic flowchart of a method for transmitting information according to an embodiment of the present invention.

FIG. 1 shows a schematic flowchart of a method for transmitting information according to an embodiment of the present invention. As shown in FIG. 1, the method includes the following steps.

S110: Receive a downlink assignment sent by a base station, where the downlink assignment includes a trigger flag, where the trigger flag is used to indicate a trigger state of aperiodic channel state information CSI.

S120: Determine an uplink resource used to send the aperiodic CSI.

S130: Send, on the uplink resource according to the trigger flag, the aperiodic CSI to the base station.

For example, when there is no uplink data scheduling, a user equipment receives a downlink assignment sent by the base station, where the downlink assignment includes the trigger flag used to indicate the trigger state of the aperiodic CSI, and the user equipment sends, on the determined uplink resource used to send the aperiodic CSI, the aperiodic CSI to the base station according to the trigger flag, thereby enabling triggering of an aperiodic CSI feedback.

Therefore, according to the method for transmitting information of the embodiment of the present invention, a downlink assignment includes a trigger flag, where the trigger flag is used to indicate a trigger state of aperiodic channel state information CSI, thereby enabling triggering of an aperiodic CSI feedback, reducing control channel overhead, and improving a utilization rate of system resources.

It should be understood that the embodiment of the present invention is described by using a scenario without uplink data scheduling as an example, but the embodiment of the present invention is not limited thereto. For example, in a scenario with uplink data scheduling, the method in the embodiment of the present invention may also be used to trigger an aperiodic CSI feedback.

It should also be understood that, the downlink assignment DL_Assignment in the embodiment of the present invention may specifically be a PDCCH in a start release LTE system. That is, the downlink assignment DL_Assignment is located in several symbols at the beginning of a subframe. The downlink assignment DL_Assignment may also be an enhanced physical downlink control channel ("E-PDCCH") in an LTE system of a subsequent evolved release. That is, the downlink assignment DL_Assignment is a PDCCH demodulated based on a UE specific reference symbol, located in a PDSCH area and frequency-division multiplexed with a PDSCH.

In S110, the base station may configure an aperiodic CSI mode for a UE. Specifically, the aperiodic CSI mode may be aperiodic CSI under carrier aggregation, aperiodic CSI transmitted by coordinated multiple points ("CoMP"), aperiodic CSI specified by a resource block RB, or aperiodic CSI combining the foregoing cases. Therefore, the user equipment receives the downlink assignment DL_Assignment from the base station, where the trigger flag included in the downlink assignment may be used to indicate the trigger state of the aperiodic CSI.

Optionally, the trigger flag may be a bit, a scrambling code or other time frequency resource information. Specifically, the trigger state indicated by the trigger flag may include: not triggering aperiodic CSI, triggering aperiodic CSI of a carrier where downlink data scheduled by the downlink assignment DL_Assignment is located, triggering aperiodic CSI of a downlink carrier where the downlink assignment DL_Assignment is located, and triggering aperiodic CSI of one or more downlink carrier sets.

Specifically, the UE receives the DL_Assignment sent by the base station, where downlink resource assignment information in the downlink assignment DL_Assignment indicates a resource assignment for downlink data of the UE. The downlink assignment DL_Assignment may further include a trigger flag of aperiodic CSI, where the trigger flag is used to indicate the trigger state of the aperiodic channel state information CSI.

For example, assuming that the trigger flag is a trigger bit, if the trigger bit is set to "1", the UE may determine, according to the trigger bit, that it is necessary to feed back the aperiodic CSI; and if the trigger bit is set to "0", the UE may determine that it is unnecessary to feed back the aperiodic CSI. If two bits are used as trigger bits, specifically, the trigger flag may further indicate the following trigger states of the aperiodic CSI. For example, "00" indicates not triggering aperiodic CSI, "01" indicates triggering aperiodic CSI of a carrier where the downlink data scheduled by the downlink assignment DL_Assignment is located, "10" indicates triggering aperiodic CSI of a first downlink carrier set, and "11" indicates triggering aperiodic CSI of a second downlink carrier set. The first and the second downlink carrier sets may be configured through radio resource control RRC signaling.

Optionally, the foregoing method may further be extended to a case of downlink multi-carrier scheduling. For example, if the downlink assignment DL_Assignment schedules at least two downlink carriers, the foregoing trigger state "01" indicates triggering aperiodic CSI of a downlink carrier that has a highest priority in the downlink data scheduled by the downlink assignment DL_Assignment, such as a downlink primary carrier, or it may indicate triggering aperiodic CSI of a downlink carrier where the downlink assignment DL_Assignment is located. The foregoing trigger state may further include only triggering aperiodic CSI of a downlink secondary carrier.

Similarly, the foregoing method may further be extended to a case of uplink multi-carrier scheduling. For example, an UL_Grant schedules at least two uplink carriers, and it is assumed that there are two trigger bits. Then, the trigger state may be: "00" indicates not triggering, "01" indicates triggering aperiodic CSI of a downlink carrier corresponding to an uplink carrier that has a highest priority among uplink carriers scheduled by the UL_Grant, such as an uplink primary carrier, or indicates triggering aperiodic CSI of a downlink carrier where the UL_Grant is located, "10" indicates triggering aperiodic CSI of a first downlink carrier set, and "11" indicates triggering aperiodic CSI of a second downlink carrier set. The first and second downlink carrier sets may be configured through RRC signaling.

In S120, the user equipment may determine the uplink resource according to the downlink resource assignment information in the downlink assignment, and may also determine the uplink resource according to uplink resource indication information included in the downlink assignment, and may further determine, according to a subframe where the downlink assignment is received and a pre-configured rule, a subframe used to send the aperiodic CSI, and determine a pre-configured resource in the subframe or a part of the pre-configured resource as the uplink resource. The above solutions will be described in detail below.

In the embodiment of the present invention, optionally, the user equipment determines the uplink resource according to the downlink resource assignment information in the downlink assignment, where the uplink resource includes a start RB number and a quantity of RBs.

Specifically and optionally, the user equipment may determine a value obtained by a resource block ("RB") number of a downlink resource assigned by the downlink assignment modulo a total quantity of RBs in uplink bandwidth as an RB number of the uplink resource. For example, if the downlink assignment DL_Assignment indicates 3 or 4 consecutive RBs are used for scheduling of downlink data, where the consecutive RBs are 10, 11 and 12, or 10, 11, 12 and 13, the UE may use the RB numbers modulo the total quantity of RBs in uplink bandwidth. For example, there are totally 50 RBs in uplink, and therefore, the UE may determine to use uplink RBs 10-12 or 10-13 to feed back the aperiodic CSI.

Optionally, the user equipment may also determine the uplink resource according to a pre-configured quantity of RBs and a start RB number of the downlink resource. The pre-configured quantity of RBs may be defined in advance without a signaling notification, and may be dynamically configured through RRC signaling or the like. Optionally, the user equipment uses a start RB number of the downlink resource assigned by the downlink assignment DL_Assignment as a start RB number of the uplink resource feeding back aperiodic CSI, while the quantity of RBs of the uplink resource feeding back the aperiodic CSI may adopt a pre-configured size. For example, if resources occupied by the downlink data indicated by the downlink assignment DL_Assignment are RBs 10, 12, 14, 16, 18 and 20, the UE determines that the start RB number of the uplink resource fed back by the uplink aperiodic CSI is 10 according to these RBs. If the size of pre-configured resources feeding back the aperiodic CSI is 4 RBs, the UE may determine to use uplink RBs 10, 11, 12 and 13 to feed back the aperiodic CSI.

Optionally, the user equipment determines the uplink resource according to a corresponding relation between a quantity of RBs of the downlink resource and/or a quantity of downlink carriers corresponding to the aperiodic CSI and a quantity of RBs of the uplink resource. For example, there is a corresponding relation between a quantity of RBs of the uplink resource feeding back the aperiodic CSI and a quantity of RBs assigned by the downlink resource in the downlink assignment DL_Assignment. The corresponding relation may be a proportional relationship, where the proportional relationship may be pre-configured, or notified through RRC signaling or the DL_Assignment. Specifically, the base station first determines a load size of the aperiodic CSI, then determines a quantity of RBs required for transmitting the CSI so as to ensure performance of the CSI, and then calculates, according to the proportional relationship, such as an coefficient, a quantity of RBs of the downlink resource to be scheduled by the DL_Assignment. Alternatively, the corresponding relation may be a corresponding relation between a quantity of RBs of the uplink resource of the aperiodic CSI and a quantity of downlink carriers corresponding to the aperiodic CSI. For example, when the aperiodic CSI corresponds to one downlink carrier, 4 RBs may be assigned for transmission; and when the aperiodic CSI corresponds to two downlink carriers, 8 RBs may be assigned for transmission. Alternatively, the corresponding relation may also be a corresponding relation between a quantity of RBs of the uplink resource of the aperiodic CSI and a quantity of downlink RBs assigned in the DL_Assignment. For example, when the quantity of assigned downlink RBs is 1, 5, 9, . . . , a quantity of uplink RBs is 1; when the quantity of assigned downlink RBs is 2, 6, 10, . . . , the quantity of uplink RBs is 2; when the quantity of assigned downlink RBs is 3, 7, 11, . . . , the quantity of uplink RBs is 3; and when the quantity of assigned downlink RBs is 4, 8, 12, . . . , the quantity of uplink RBs is 4. It should be understood that, the embodiment of the present invention is described merely through the examples, and the embodiment of the present invention is not limited thereto, and an uplink resource feeding back the aperiodic CSI may still be determined according to other corresponding relations.

In the embodiment of the present invention, optionally, the user equipment determines the uplink resource according to uplink resource indication information included in the downlink assignment. The uplink resource indication information may adopt an indication manner using a bit in the DL_Assignment or an implicit indication manner, where the implicit manner, for example, adopts a CRC scrambling code in the downlink assignment DL_Assignment, a time frequency resource of the DL_Assignment, scheduling time of the DL_Assignment or a carrier where the DL_Assignment is located.

Specifically and optionally, the uplink resource indication information is used to indicate one scheme of a group of pre-configured uplink resource assignment schemes. For example, the base station may pre-configure four aperiodic CSI resources for the UE through RRC signaling, where a quantity of RBs of the four aperiodic CSI resources may be configured independently, and which of the four resources is specifically adopted to feed back the current aperiodic CSI is dynamically indicated by the downlink assignment DL_Assignment. For example, aperiodic CSI corresponding to a downlink assignment DL_Assignment scheduled in a subframe whose subframe number is 1, 5, 9, . . . , and so on is transmitted on a first resource; aperiodic CSI corresponding to a DL_Assignment scheduled in a subframe whose subframe number is 2, 6, 10, . . . , and so on is transmitted on a second resource; aperiodic CSI corresponding to a DL_Assignment scheduled in a subframe whose subframe number is 3, 7, 11, . . . , and so on is transmitted on a third resource; and aperiodic CSI corresponding to a DL_Assignment scheduled in a subframe whose subframe number is 4, 8, 12, . . . , and so on is transmitted on a fourth resource. Similarly, an indication method according to a scheduling time of the DL_Assignment is not limited in the present invention.

Optionally, the uplink resource indication information is used to indicate that the uplink resource is determined according to downlink resource assignment information in the downlink assignment, or the uplink resource is determined according to a pre-configured uplink resource assignment scheme group. For example, the base station pre-configures one or more aperiodic CSI resources for a UE through RRC signaling, and dynamically indicates, through the DL_Assignment, that the resource used by the aperiodic CSI is a resource determined according to the downlink resource assignment information in the DL_Assignment, or one resource configured through the RRC signaling, where the resource determined according to the downlink resource assignment information in the DL_Assignment may be determined according to the embodiment of the present invention.

Optionally, the uplink resource indication information includes a specific position of the uplink resource. For example, the downlink assignment includes downlink resource assignment information and uplink resource indication information, where the uplink resource indication information may be borne in the downlink resource assignment information. That is, the downlink resource assignment information assigns a resource for the downlink data and a resource for the uplink aperiodic CSI simultaneously. For example, a downlink resource assignment bit field in the DL_Assignment may be divided into two parts to respectively correspond to resource assignment of the downlink data and resource assignment of the uplink aperiodic CSI.

In the embodiment of the present invention, optionally, the user equipment determines, according to a subframe where the downlink assignment is received and a pre-configured rule, a subframe used to send the aperiodic CSI, and determines a pre-configured resource in the subframe and used to send the aperiodic CSI or a part of the pre-configured resource as the uplink resource. The pre-configured rule, for example, includes: a determined subframe used to send the aperiodic CSI is closest to a subframe where the downlink assignment is sent; a resource configured in a determined subframe used to send the aperiodic CSI, for example, its size and start position, can satisfy sending of currently required aperiodic CSI; a distance between a determined subframe used to send the aperiodic CSI and a subframe where the downlink assignment is sent is greater than or equal to 4 subframes. The pre-configured rule may also include: if a pre-configured uplink resource in the subframe used to send the aperiodic CSI is more than a maximum resource required for sending the aperiodic CSI, such as the quantity of RBs, the UE sends the aperiodic CSI in the subframe according to the maximum resource. That is, a part of the pre-configured resource is determined as a resource to send the aperiodic CSI.

Specifically, one embodiment is that the base station may configure, through RRC signaling, an aperiodic CSI resource in a subframe that can be used to send the aperiodic CSI, where the aperiodic CSI resource in the subframe that can be used to send the aperiodic CSI may be configured independently. For example, a quantity of RBs and/or an RB start point may be different, and then in the subframe that can be used to send the aperiodic CSI, a subframe that satisfies a sending condition of the aperiodic CSI triggered by the DL_Assignment is determined according to the DL_Assignment as a sending subframe of the aperiodic CSI, and the UE further sends the aperiodic CSI according to the configured aperiodic CSI resource in the sending subframe of the aperiodic CSI that satisfies the condition. The condition needs to be satisfied is that an aperiodic CSI resource configured in a subframe used to send the aperiodic CSI, for example, an RB size or start position, needs to satisfy sending of the aperiodic CSI, and the subframe is closest to the sending time of the DL_Assignment triggering the aperiodic CSI, where the distance needs to satisfy a condition of being greater than or equal to 4 subframes.

For example, the base station configures RB sizes of aperiodic CSI in subframes 4, 5, 6, and 7 to be respectively 4, 8, 12, and 16, the base station sends a DL_Assignment triggering aperiodic CSI in subframe 0, and aperiodic CSI of two downlink carriers needs to be triggered. After receiving the DL_Assignment, the UE finds that subframe 4 is a subframe closest to the DL_Assignment with a distance greater than or equal to 4 subframes. However, a resource of 4 RBs in subframe 4 cannot satisfy sending of this aperiodic CSI, and therefore, the UE will determine that a sending subframe of this aperiodic CSI is subframe 5, because 8 RBs are capable of bearing aperiodic CSI corresponding to two carriers.

For another example, the base station configures RB sizes of aperiodic CSI in subframes 4, 5, 6, and 7 to be respectively 4, 8, 12, 16, the base station sends a DL_Assignment triggering aperiodic CSI in subframe 1, and aperiodic CSI of one downlink carrier needs to be triggered. Therefore, after receiving the DL_Assignment, the UE finds that subframe 5 is a subframe closest to the DL_Assignment with a distance greater than or equal to 4 subframes. However, a resource of 8 RBs in subframe 5 is greater than a maximum resource required for sending the aperiodic CSI of the downlink carrier. It is assumed that the maximum resource is 4 RBs (any other value is not limited herein), the UE may send the aperiodic CSI of the downlink carrier according to the maximum resource, that is 4 RBs, in subframe 5. Specifically, the 4 RBs may be selected from 8 pre-configured RBs, for example, 4 RBs at the beginning are selected, or another selection manner is used.

Another embodiment is that feedback time of the aperiodic CSI is kept to be 4 subframes plus time of the DL_Assignment triggering the CSI. Under this assumption, the base station pre-configures a resource of the uplink aperiodic CSI in an uplink subframe capable of sending the aperiodic CSI, where more than one resource may be configured, and each corresponds to one configured aperiodic CSI feedback. For example, two resources are configured, where one corresponds to aperiodic CSI of one or two carriers, and the other corresponds to aperiodic CSI of more than two carriers. Or, one resource may be configured. Specifically, the one resource may be configured according to a quantity of configured downlink carriers of the UE or a quantity of downlink carriers in an active state, and all or a part of the one pre-configured resource is selected, according to a quantity of carriers corresponding to the aperiodic CSI triggered by the DL_Assignment, to send the aperiodic CSI. Specifically, for example, the quantity of configured downlink carriers of the UE is 3, and the base station may reserve one uplink aperiodic CSI resource (assuming 12 RBs, and aperiodic CSI of one downlink carrier corresponds to 4 RBs at most) according to 3 downlink carriers. If the DL_Assignment triggers aperiodic CSI of 3 carriers of the UE, the UE sends the aperiodic CSI on all of the pre-configured resource, and if the DL_Assignment triggers aperiodic CSI of 2 carriers of the UE, the UE selects a part of the resource from the pre-configured resource, for example, 8 RBs, to send aperiodic CSI of the 2 carriers.

In S130, the user equipment sends, on the uplink resource according to the trigger flag, the aperiodic CSI to the base station. Optionally, the user equipment sends, on an uplink primary carrier, or on an uplink carrier corresponding to a downlink carrier scheduled by the downlink assignment, or on an uplink carrier corresponding to a downlink carrier where the downlink assignment is located, the aperiodic CSI to the base station. Optionally, if the downlink assignment schedules more than one downlink carrier, the aperiodic CSI is sent on the uplink carrier corresponding to the downlink carrier scheduled by the downlink assignment, and further, the aperiodic CSI is sent on an uplink carrier corresponding to a downlink carrier that has a highest priority (such as a downlink primary carrier) among the more than one downlink carrier scheduled by the downlink assignment.

Therefore, according to the method for transmitting information of the embodiment of the present invention, a downlink assignment includes a trigger flag, where the trigger flag is used to indicate a trigger state of aperiodic channel state information CSI, thereby enabling triggering of an aperiodic CSI feedback, reducing control channel overhead, and improving a utilization rate of system resources.

The foregoing describes, with reference to FIG. 1, the method for transmitting information according to the embodiment of the present invention from the perspective of a user equipment. The following describes, with reference to FIG. 2, a method for transmitting information according to an embodiment of the present invention from the perspective of a base station.

Figure 2:
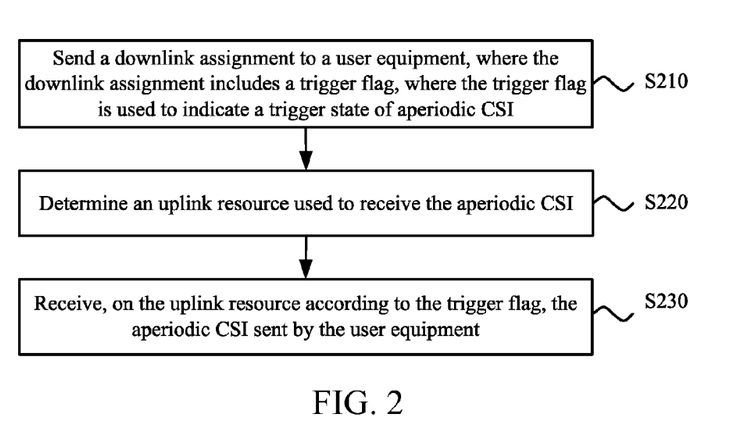
FIG. 2 is a schematic flowchart of a method for transmitting information according to another embodiment of the present invention.

FIG. 2 shows a schematic flowchart of a method for transmitting information according to an embodiment of the present invention. As shown in FIG. 2, the method includes:

S210: Send a downlink assignment to a user equipment, where the downlink assignment includes a trigger flag, where the trigger flag is used to indicate a trigger state of aperiodic channel state information CSI.

S220: Determine an uplink resource used to receive the aperiodic CSI.

S230: Receive, on the uplink resource according to the trigger flag, the aperiodic CSI sent by the user equipment.

Therefore, according to the method for transmitting information of the embodiment of the present invention, a downlink assignment includes a trigger flag, where the trigger flag is used to indicate a trigger state of aperiodic channel state information CSI, thereby enabling triggering of an aperiodic CSI feedback, reducing control channel overhead, and improving a utilization rate of system resources.

In the embodiment of the present invention, optionally, the receiving, on the uplink resource, the aperiodic CSI sent by the user equipment includes: receiving, on an uplink primary carrier, or on an uplink carrier corresponding to a downlink carrier scheduled by a downlink assignment, or on an uplink carrier corresponding to a downlink carrier where the downlink assignment is located, the aperiodic CSI sent by the user equipment.

Optionally, if the downlink assignment schedules more than one downlink carrier, the aperiodic CSI is sent on an uplink carrier corresponding to a downlink carrier scheduled by the downlink assignment, and further, the aperiodic CSI is sent on an uplink carrier corresponding to a downlink carrier (such as a downlink primary carrier) that has a highest priority among the more than one downlink carrier scheduled by the downlink assignment.

In the embodiment of the present invention, optionally, the determining an uplink resource used to receive the aperiodic CSI includes: determining the uplink resource according to downlink resource assignment information in the downlink assignment, where the uplink resource includes a start RB number and a quantity of RBs.

In the embodiment of the present invention, optionally, the determining the uplink resource according to downlink resource assignment information in the downlink assignment includes: determining a value obtained by a resource block RB number of a downlink resource assigned by the downlink assignment modulo a total quantity of RBs in uplink bandwidth as an RB number of the uplink resource; or determining the uplink resource according to the pre-configured quantity of RBs and a start RB number of the downlink resource; or determining the uplink resource according to a corresponding relation between a quantity of RBs of the downlink resource and/or a quantity of downlink carriers corresponding to the aperiodic CSI and the quantity of RBs of the uplink resource.

In the embodiment of the present invention, optionally, the determining an uplink resource used to receive the aperiodic CSI includes: determining the uplink resource according to uplink resource indication information included in the downlink assignment.

In the embodiment of the present invention, optionally, the uplink resource indication information is used to indicate one scheme of a group of pre-configured uplink resource assignment schemes; or the uplink resource indication information is used to indicate that the uplink resource is determined according to downlink resource assignment information in the downlink assignment, or the uplink resource is determined according to a pre-configured uplink resource assignment scheme group; or the uplink resource indication information includes a specific position of the uplink resource.

In the embodiment of the present invention, optionally, the determining an uplink resource used to send the aperiodic CSI includes: determining, according to a subframe where the downlink assignment is sent and a pre-configured rule, a subframe used to receive the aperiodic CSI, and determining a pre-configured resource in the subframe and used to receive the aperiodic CSI or a part of the pre-configured resource as the uplink resource.

According to the method for transmitting information of the embodiment of the present invention, a downlink assignment includes a trigger flag, where the trigger flag is used to indicates trigger state of aperiodic channel state information CSI, thereby enabling triggering of an aperiodic CSI feedback, reducing control channel overhead, and improving a utilization rate of system resources.

With reference to FIG. 1 and FIG. 2, the method for transmitting information according to the embodiment of the present invention is described in detail in the foregoing text, and with reference to FIG. 3 to FIG. 8, a user equipment and a base station according to embodiments of the present invention are described in detail in the following.

Figure 3:
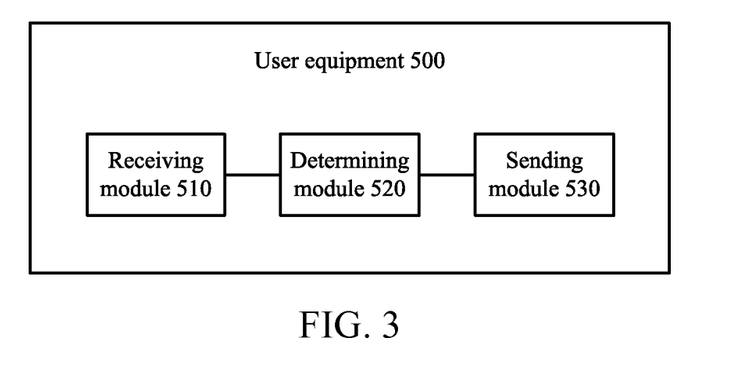
FIG. 3 is a schematic block diagram of a user equipment according to an embodiment of the present invention.

FIG. 3 is a schematic block diagram of a user equipment 500 according to an embodiment of the present invention. As shown in FIG. 3, the user equipment 500 includes a number of modules. A receiving module 510 is configured to receive a downlink assignment sent by a base station. The downlink assignment includes a trigger flag that is used to indicate a trigger state of aperiodic channel state information CSI. A determining module 520 is configured to determine an uplink resource used to send the aperiodic CSI. A sending module 530 is configured to send, according to the trigger flag included in the downlink assignment received by the receiving module 510, the aperiodic CSI to the base station on the uplink resource determined by the determining module 520.

According to the user equipment of the embodiment of the present invention, a downlink assignment includes a trigger flag, where the trigger flag is used to indicate a trigger state of aperiodic channel state information CSI, thereby enabling triggering of an aperiodic CSI feedback, reducing control channel overhead, and improving a utilization rate of system resources.

Figure 4:
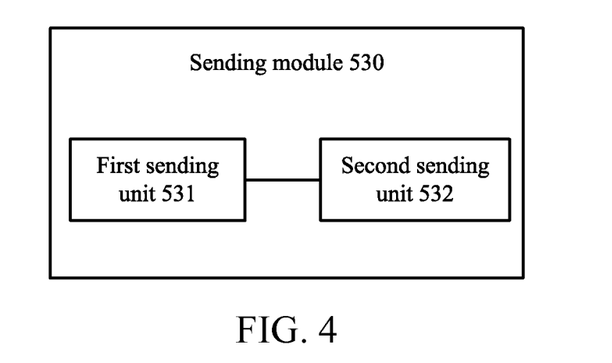
FIG. 4 is a schematic block diagram of a sending module of a user equipment according to an embodiment of the present invention.

In the embodiment of the present invention, optionally, as shown in FIG. 4, the sending module 530 includes a first sending unit 531, where the first sending unit 531 configured to send, on an uplink primary carrier determined by the determining module 520, or on an uplink carrier determined by the determining module 520 and corresponding to a downlink carrier scheduled by the downlink assignment, or on an uplink carrier determined by the determining module 520 and corresponding to a downlink carrier where the downlink assignment is located, the aperiodic CSI to the base station.

In the embodiment of the present invention, if the downlink assignment schedules more than one downlink carrier, the aperiodic CSI is sent on an uplink carrier corresponding to a downlink carrier scheduled by the downlink assignment, and further, the aperiodic CSI is sent on an uplink carrier corresponding to a downlink carrier (such as a downlink primary carrier) that has a highest priority between the more than one downlink carrier scheduled by the downlink assignment. Therefore, optionally, as shown in FIG. 4, the sending module 530 includes a second sending unit 532, where the second sending unit 532 is configured to send, on an uplink carrier corresponding to a downlink carrier that has a highest priority among at least two downlink carriers scheduled by the downlink assignment received by the receiving module 510, the aperiodic CSI to the base station.

Figure 5:
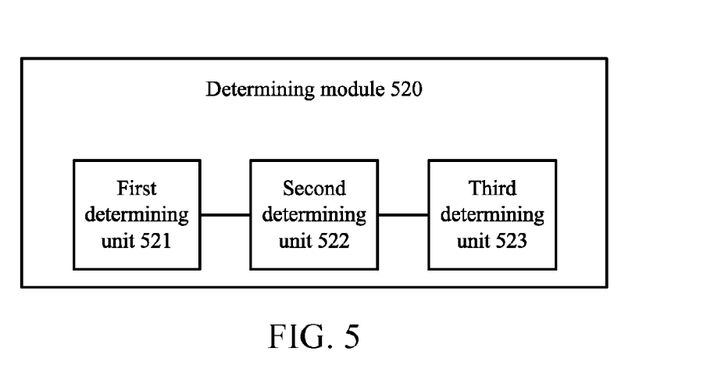
FIG. 5 is a schematic block diagram of a determining module of a user equipment according to an embodiment of the present invention.

In the embodiment of the present invention, optionally, as shown in FIG. 5, the determining module 520 includes a first determining unit 521, where the first determining unit 521 is configured to determine the uplink resource according to the downlink resource assignment information in the downlink assignment received by the receiving module 510, where the uplink resource includes a start RB number and a quantity of RBs.

Optionally, the first determining unit 521 is further configured to determine a value obtained by a resource block RB number of the downlink resource assigned by the downlink assignment received by the receiving module 510 modulo a total quantity of RBs in uplink bandwidth as an RB number of the uplink resource; or determine the uplink resource according to a pre-configured quantity of RBs and a start RB number of the downlink resource; or determine the uplink resource according to a corresponding relation between a quantity of RBs of the downlink resource and/or a quantity of downlink carriers corresponding to the aperiodic CSI and the quantity of RBs of the uplink resource In the embodiment of the present invention, optionally, as shown in FIG. 5, the determining module 520 includes a second determining unit 522, where the second determining unit 522 is configured to determine the uplink resource according to uplink resource indication information included in the downlink assignment received by the receiving module 510.

Optionally, the uplink resource indication information included in the downlink assignment received by the receiving module 510 is used to indicate one scheme of a group of pre-configured uplink resource assignment schemes; or the uplink resource indication information is used to indicate that the uplink resource is determined according to the downlink resource assignment information in the downlink assignment, or the uplink resource is determined according to according to a pre-configured uplink resource assignment scheme group; or the uplink resource indication information includes a specific position of the uplink resource.

In the embodiment of the present invention, optionally, as show in FIG. 5, the determining module 520 includes a third determining unit 523, where the third determining unit 523 is configured to determine, according to a subframe where the downlink assignment is received by the receiving module 510 and a pre-configured rule, a subframe used to send the aperiodic CSI, and determine a pre-configured resource in the subframe and used to send the aperiodic CSI or a part of the pre-configured resource as the uplink resource.

The user equipment 500 according to the embodiment of the present invention may correspond to the user equipment in the method for transmitting information according to the embodiment of the present invention, and the foregoing and other operations and/or functions of each module in the user equipment 500 respectively implement corresponding procedures of the method shown in FIG. 1 and FIG. 2, which are not repeated herein for brevity.

According to the user equipment of the embodiment of the present invention, a downlink assignment includes a trigger flag, where the trigger flag is used to indicate a trigger state of aperiodic channel state information CSI, thereby enabling triggering of an aperiodic CSI feedback, reducing control channel overhead, and improving a utilization rate of system resources.

Figure 6:
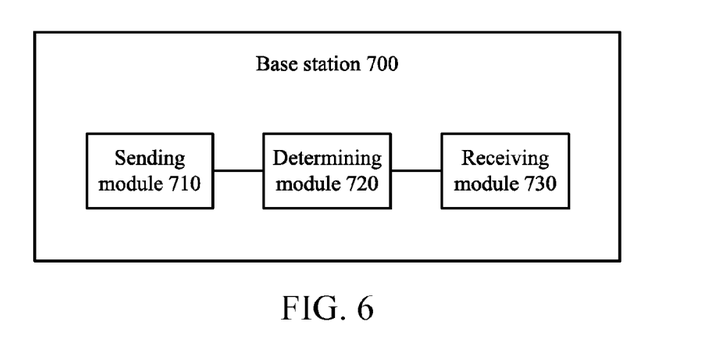
FIG. 6 is a schematic block diagram of a base station according to an embodiment of the present invention.

FIG. 6 shows a schematic block diagram of a base station 700 according to an embodiment of the present invention. As shown in FIG. 6, the base station 700 includes a number of modules. A sending module 710 is configured to send a downlink assignment to a user equipment. The downlink assignment includes a trigger flag that is used to indicate a trigger state of aperiodic channel state information CSI. A determining module 720 is configured to determine an uplink resource used to receive the aperiodic CSI. A receiving module 730 is configured to receive, on the uplink resource determined by the determining module 720 and according to the trigger flag included in the downlink assignment sent by the sending module 710, the aperiodic CSI sent by the user equipment.

According to the base station of the embodiment of the present invention, a downlink assignment includes a trigger flag, where the trigger flag is used to indicate a trigger state of aperiodic channel state information CSI, thereby enabling triggering of an aperiodic CSI feedback, reducing control channel overhead, and improving a utilization rate of system resources.

Figure 7:
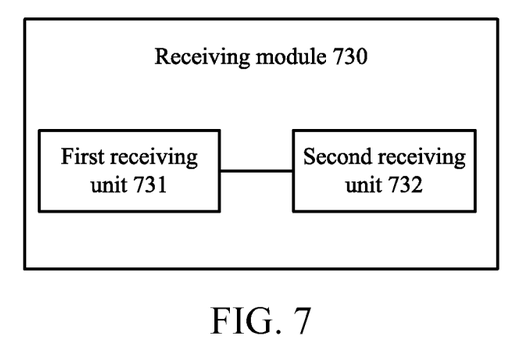
FIG. 7 is a schematic block diagram of a receiving module of a base station according to an embodiment of the present invention.

In the embodiment of the present invention, optionally, as shown in FIG. 7, the receiving module 730 includes a first receiving unit 731, where the first receiving unit 731 is configured to receive, on an uplink primary carrier determined by the determining module 720, or on an uplink carrier determined by the determining module 720 and corresponding to a downlink carrier scheduled by the downlink assignment, or on an uplink carrier determined by the determining module 720 and corresponding to a downlink carrier where the downlink assignment is located, the aperiodic CSI sent by the user equipment.

In the embodiment of the present invention, if the downlink assignment schedules more than one downlink carrier, the aperiodic CSI is sent on an uplink carrier corresponding to a downlink carrier scheduled by the downlink assignment, and further, the aperiodic CSI is sent on an uplink carrier corresponding to a downlink carrier (such as a downlink primary carrier) that has a highest priority among the more than one downlink carrier scheduled by the downlink assignment. Therefore, optionally, as shown in FIG. 7, the receiving module 730 includes a second receiving unit 732, where the second receiving unit 732 is configured to receive, on an uplink carrier corresponding to a downlink carrier that has a highest priority among at least two downlink carriers scheduled by the downlink assignment sent by the sending module 710, the aperiodic CSI sent by the user equipment.

Figure 8:
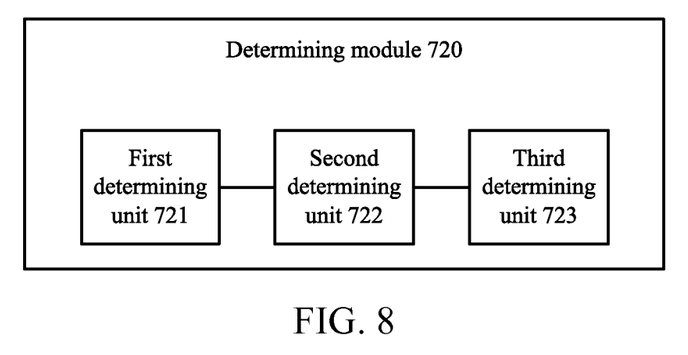
FIG. 8 is a schematic block diagram of a determining module of a base station according to an embodiment of the present invention.

In the embodiment of the present invention, optionally, as shown in FIG. 8, the determining module 720 includes a first determining unit 721, where the first determining unit 721 is configured to determine the uplink resource according to downlink resource assignment information in the downlink assignment sent by the sending module 710, where the uplink resource includes a start RB number and a quantity of RBs.

Optionally, the first determining unit 721 is further configured to determine a value obtained by a resource block RB number of the downlink resource assigned by the downlink assignment sent by the sending module 710 modulo a total quantity of RBs in uplink bandwidth as an RB number of the uplink resource; or determine the uplink resource according to a pre-configured quantity of RBs and a start RB number of the downlink resource; or determine the uplink resource according to a corresponding relation between a quantity of RBs of the downlink resource and/or a quantity of downlink carriers corresponding to the aperiodic CSI and the quantity of RBs of the uplink resource.

In the embodiment of the present invention, optionally, as shown in FIG. 8, the determining module 720 includes a second determining unit 722, where the second determining unit 722 is configured to determine the uplink resource according to uplink resource indication information included in the downlink assignment sent by the sending module 710.

Optionally, the uplink resource indication information included in the downlink assignment sent by the sending module 710 is used to indicate one scheme of a group of pre-configured uplink resource assignment schemes; or the uplink resource indication information is used to indicate that the uplink resource is determined according to downlink resource assignment information in the downlink assignment, or the uplink resource is determined according to a pre-configured uplink resource assignment scheme group; or the uplink resource indication information includes a specific position of the uplink resource.

In the embodiment of the present invention, optionally, as show in FIG. 8, the determining module 720 includes a third determining unit 723, where the third determining unit 723 is configured to determine, according to a subframe where the downlink assignment is sent by the sending module 710 and a pre-configured rule, a subframe used to receive the aperiodic CSI, and determine a pre-configured resource in the subframe and used to receive the aperiodic CSI or a part of the pre-configured resource as the uplink resource.

The base station 700 according to the embodiment of the present invention may correspond to the base station in the method for transmitting information according to the embodiment of the present invention, and the foregoing and other operations and/or functions of each module in the base station 700 respectively implement corresponding procedures of the method shown in FIG. 1 and FIG. 2, which are not repeated herein for brevity.

According to the base station of the embodiment of the present invention, a downlink assignment includes a trigger flag, where the trigger flag is used to indicate a trigger state of aperiodic channel state information CSI, thereby enabling triggering of an aperiodic CSI feedback, reducing control channel overhead, and improving a utilization rate of system resources.

A person of ordinary skill in the art may know that, with reference to the embodiments disclosed herein, units and algorithm steps of each example described can be implemented by electronic hardware, computer software, or a combination thereof. To clearly describe interchangeability between hardware and software, the foregoing has generally described compositions and steps of each example based on functions. Whether the functions are performed by hardware or software depends on particular applications and design constraint conditions of the technical solution. A person skilled in the art may use different methods to implement the described functions for each particular application, but such implementation shall not be considered going beyond the scope of the present invention.

It can be clearly understood by a person skilled in the art that, for the purpose of convenient and brief description, for detailed working processes of the foregoing system, apparatuses, and units, reference may be made to corresponding processes in the foregoing method embodiments, which are not repeated herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, that is, may be located in one position, or may be distributed on a plurality of network units. Some or all of the units may be selected to achieve the objective of the solution of the embodiments of the present invention according to actual needs.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any mediums that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any equivalent modification or replacement readily figured out by a person skilled in the art within the technical scope of the present invention shall fall within the protection scope of the present invention. Therefore, the protection scope of the present invention shall be subject to the protection scope of the claims.

What is claimed is:

1. A method for transmitting information, the method comprising:
    receiving a downlink assignment sent by a base station, wherein the downlink assignment comprises a trigger flag and wherein the trigger flag is used to indicate a trigger state from a plurality of trigger states, and wherein the plurality of trigger states comprises not triggering aperiodic channel state information (CSI), triggering aperiodic CSI of a carrier where downlink data scheduled by the downlink assignment is located, triggering aperiodic CSI of a downlink carrier where the downlink assignment is located, and triggering aperiodic CSI of a downlink carrier set;
    determining an uplink resource used to send the aperiodic CSI that corresponds to the trigger flag; and
    sending, on the uplink resource and in response to the trigger flag indicating the triggering of aperiodic CSI, aperiodic CSI that corresponds to the trigger flag to the base station.

2. The method according to claim 1, wherein sending the aperiodic CSI to the base station comprises sending the aperiodic CSI to the base station on an uplink primary carrier.

3. The method according to claim 1, wherein sending the aperiodic CSI to the base station comprises sending the aperiodic CSI to the base station on an uplink carrier corresponding to a downlink carrier scheduled by the downlink assignment.

4. The method according to claim 1, wherein sending the aperiodic CSI to the base station comprises sending the aperiodic CSI to the base station on an uplink carrier corresponding to a downlink carrier where the downlink assignment is located.

5. The method according to claim 1, wherein determining the uplink resource used to send the aperiodic CSI comprises determining the uplink resource according to uplink resource indication information comprised in the downlink assignment.

6. The method according to claim 1, wherein determining the uplink resource used to send the aperiodic CSI comprises determining, according to a subframe where the downlink assignment is received and a pre-configured rule, a subframe used to send the aperiodic CSI, and determining a pre-configured resource in the subframe and used to send the aperiodic CSI or a part of the pre-configured resource as the uplink resource.

7. A method for transmitting information, the method comprising:
    sending a downlink assignment to a user equipment, wherein the downlink assignment comprises a trigger flag, and wherein the trigger flag is used to indicate a trigger state from a plurality of trigger states, and wherein the plurality of trigger states comprises not triggering aperiodic channel state information (CSI), triggering aperiodic CSI of a carrier where downlink data scheduled by the downlink assignment is located, triggering aperiodic CSI of a first downlink carrier set, and triggering aperiodic CIS of a second downlink carrier set;
    determining an uplink resource used to receive the aperiodic CSI that corresponds to the trigger flag; and
    receiving, on the uplink resource and in response to the trigger flag indicating the triggering of aperiodic CSI aperiodic CSI that corresponds to the trigger flag sent by the user equipment.

8. The method according to claim 7, wherein receiving, the aperiodic CSI sent by the user equipment comprises receiving the aperiodic CSI sent by the user equipment, on an uplink primary carrier, or on an uplink carrier corresponding to a downlink carrier scheduled by the downlink assignment, or on an uplink carrier corresponding to a downlink carrier where the downlink assignment is located.

9. The method according to claim 7, wherein determining the uplink resource used to receive the aperiodic CSI comprises determining the uplink resource according to uplink resource indication information comprised in the downlink assignment.

10. The method according to claim 7, wherein determining the uplink resource used to send the aperiodic CSI comprises determining, according to a subframe where the downlink assignment is sent and a pre-configured rule, a subframe used to receive the aperiodic CSI, and determining a pre-configured resource in the subframe and used to receive the aperiodic CSI or a part of the pre-configured resource as the uplink resource.

11. A user equipment, comprising:
    a receiver, configured to receive a downlink assignment sent by a base station, wherein the downlink assignment schedules a plurality of downlink carriers, wherein the downlink assignment comprises a trigger flag, and wherein the trigger flag is used to indicate a trigger state from a plurality of trigger states, the plurality of trigger states comprising not triggering aperiodic channel state information (CSI), triggering aperiodic CSI of a downlink carrier that has a highest priority in downlink data scheduled by the downlink assignment, triggering aperiodic CSI of a first downlink carrier set, and triggering aperiodic CIS of a second downlink carrier set;
    a processor;
    a computer-readable storage medium storing a program to be executed by the processor, the program including instructions for:
        determining an uplink resource used to send aperiodic CSI corresponding to the trigger flag; and a transmitter, configured to send, according to the trigger flag comprised in the downlink assignment received by the receiver, aperiodic CSI corresponding to the trigger flag to the base station on the uplink resource determined by the program.

12. The user equipment according to claim 11, wherein the transmitter is further configured to send the aperiodic CSI to the base station on an uplink primary carrier determined by the program, or on an uplink carrier determined by the program and corresponding to a downlink carrier scheduled by the downlink assignment, or on an uplink carrier determined by the program and corresponding to a downlink carrier where the downlink assignment is located.

13. The user equipment according to claim 11, wherein the program further includes instructions for determining the uplink resource according to uplink resource indication information comprised in the downlink assignment received by the receiver.

14. The user equipment according to claim 11, wherein the program further includes instructions for determining, according to a subframe where the downlink assignment is received by the receiver and a pre-configured rule, a subframe used to send the aperiodic CSI, and determining a pre-configured resource in the subframe and used to send the aperiodic CSI or a part of the pre-configured resource as the uplink resource.

15. A base station, comprising:
a transmitter, configured to send a downlink assignment to a user equipment, wherein the downlink assignment comprises a trigger flag and wherein the trigger flag is used to indicate a trigger state from a plurality of trigger states, and wherein the plurality of trigger states comprises not triggering aperiodic channel state information (CSI), triggering aperiodic CSI of a carrier where downlink data scheduled by the downlink assignment is located, triggering aperiodic CSI of a downlink carrier where the downlink assignment is located, and triggering aperiodic CSI of a downlink carrier set;
a processor;
a computer-readable storage medium storing a program to be executed by the processor, the program including instructions for:
determining an uplink resource used to receive aperiodic CSI corresponding to the trigger flag; and
a receiver, configured to receive, on the uplink resource determined by the program and according to the trigger flag comprised in the downlink assignment sent by the transmitter, the aperiodic CSI corresponding to the trigger flag sent by the user equipment.

16. The base station according to claim 15, wherein the receiver is further configured to receive the aperiodic CSI sent by the user equipment on an uplink primary carrier determined by the program, or on an uplink carrier determined by the program and corresponding to a downlink carrier scheduled by the downlink assignment, or on an uplink carrier determined by the program and corresponding to a downlink carrier where the downlink assignment is located.

17. The base station according to claim 15, wherein the program further includes instructions for determining the uplink resource according to uplink resource indication information comprised in the downlink assignment sent by the transmitter.

18. The base station according to claim 15, wherein the program further includes instructions for determining, according to a subframe where the downlink assignment is sent by the transmitter and a pre-configured rule, a subframe used to receive the aperiodic CSI, and determining a pre-configured resource in the subframe and used to receive the aperiodic CSI or a part of the pre-configured resource as the uplink resource.

* * * * *